(12) United States Patent
Lim et al.

(10) Patent No.: US 12,374,737 B2
(45) Date of Patent: Jul. 29, 2025

(54) BATTERY PACK

(71) Applicant: Samsung SDI Co., Ltd., Yongin-si (KR)

(72) Inventors: Dooyong Lim, Yongin-si (KR); Jisoon Lim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 532 days.

(21) Appl. No.: 17/222,140

(22) Filed: Apr. 5, 2021

(65) Prior Publication Data
US 2021/0320348 A1    Oct. 14, 2021

(30) Foreign Application Priority Data
Apr. 14, 2020   (KR) .................. 10-2020-0045234

(51) Int. Cl.
*H01M 10/6556*      (2014.01)
*H01M 10/613*       (2014.01)
(Continued)

(52) U.S. Cl.
CPC ..... *H01M 10/6556* (2015.04); *H01M 10/613* (2015.04); *H01M 10/6554* (2015.04);
(Continued)

(58) Field of Classification Search
CPC ........... H01M 10/613; H01M 10/6554; H01M 10/6556; H01M 10/6557; H01M 50/204;
(Continued)

(56) References Cited

U.S. PATENT DOCUMENTS 8,795,867 B2   8/2014   Kim
10,374,271 B2  8/2019   Poirier et al.
(Continued)

FOREIGN PATENT DOCUMENTS

CN    1484331 A     3/2004
CN    101978549 A   2/2011
(Continued)

OTHER PUBLICATIONS

European Search Report from corresponding European Application No. 21168324.8, European Search Report mailed Sep. 9, 2021 (7 pgs.).

(Continued)

*Primary Examiner* — Lingwen R Zeng
(74) *Attorney, Agent, or Firm* — Womble Bond Dickinson (US) LLP

(57) ABSTRACT

A battery pack includes: a plurality of battery cells each including a terminal surface on which a terminal unit is arranged, a bottom surface opposite the terminal surface, and first and second side surfaces connecting the terminal surface to the bottom surface; and pack cases accommodating the plurality of battery cells in two rows such that the bottom surfaces face each other, and including a flow path plate which is between the bottom surfaces of the battery cells in the two rows, and including a plurality of flow paths accommodating a flow of a cooling medium, and first and second tank plates which define first and second connection tanks, respectively, that are fluidly connected to the plurality of flow paths, and which extend across the flow path plate from upper and lower portions of the flow path plate, respectively, to cover the first and second side surfaces.

30 Claims, 10 Drawing Sheets

(51) Int. Cl.
*H01M 10/6554* (2014.01)
*H01M 50/204* (2021.01)
*H01M 50/507* (2021.01)
*H01M 50/547* (2021.01)
*H01M 10/6557* (2014.01)
*H01M 50/209* (2021.01)
*H01M 50/258* (2021.01)

(52) U.S. Cl.
CPC ....... *H01M 50/204* (2021.01); *H01M 50/507* (2021.01); *H01M 50/547* (2021.01); *H01M 10/6557* (2015.04); *H01M 50/209* (2021.01); *H01M 50/258* (2021.01); *Y02E 60/10* (2013.01)

(58) Field of Classification Search
CPC ............. H01M 50/209; H01M 50/258; H01M 50/507; H01M 50/547; Y02E 60/10
See application file for complete search history.

(56) References Cited

U.S. PATENT DOCUMENTS

| | | | |
|---|---|---|---|
| 10,622,601 | B2 | 4/2020 | Klomberg |
| 11,171,372 | B2 | 11/2021 | Pucher et al. |
| 2004/0053127 | A1 | 3/2004 | Stocchiero |
| 2007/0087266 | A1 | 4/2007 | Bourke et al. |
| 2010/0236854 | A1 | 9/2010 | Nakamura |
| 2011/0020676 | A1 | 1/2011 | Kurosawa |
| 2013/0011713 | A1 | 1/2013 | Harada et al. |
| 2013/0143081 | A1 | 6/2013 | Watanabe et al. |
| 2013/0149583 | A1 | 6/2013 | Kurita |
| 2014/0205875 | A1 | 7/2014 | Schmidt |
| 2018/0102576 | A1 | 4/2018 | Yamamoto et al. |
| 2018/0138563 | A1 | 5/2018 | Behm et al. |
| 2018/0337375 | A1 | 11/2018 | Kellner et al. |
| 2019/0267580 | A1 | 8/2019 | Kim et al. |
| 2019/0363411 | A1* | 11/2019 | Takeuchi .......... H01M 10/6552 |
| 2020/0212525 | A1 | 7/2020 | Ogino et al. |
| 2021/0020896 | A1 | 1/2021 | Jang et al. |

FOREIGN PATENT DOCUMENTS

| | | |
|---|---|---|
| CN | 206657833 U | 11/2017 |
| CN | 107644959 A | 1/2018 |
| CN | 107946503 A | 4/2018 |
| CN | 110190215 A | 8/2019 |
| CN | 110838607 A | 2/2020 |
| CN | 110959224 A | 4/2020 |
| EP | 2 602 858 A | 6/2013 |
| EP | 3553876 A1 | 10/2019 |
| JP | 2010-15951 A | 1/2010 |
| JP | 5037740 B1 | 10/2012 |
| JP | 2018-113124 A | 7/2018 |
| JP | 2017-037754 A | 8/2018 |
| JP | 2019-71261 A | 5/2019 |
| JP | 2019-113301 A | 7/2019 |
| KR | 10-1182427 B1 | 9/2012 |
| KR | 10-2013-0005004 A | 1/2013 |
| KR | 10-2013-0130959 A | 12/2013 |
| KR | 2019-0130930 A | 11/2019 |
| WO | WO 2018/168276 A1 | 9/2018 |

OTHER PUBLICATIONS

Chinese Office Action dated Nov. 3, 2022 issued in corresponding Chinese Patent Application No. 202110401185.7 (31 pages, including 17 pages of English translation).

Korean Office Action dated Mar. 20, 2025, issued in corresponding Korean Patent Application No. 10-2020-0045234 (7 pages).

* cited by examiner

BATTERY PACK

CROSS-REFERENCE TO RELATED APPLICATION

This application claims priority to and the benefit of Korean Patent Application No. 10-2020-0045234, filed on Apr. 14, 2020 in the Korean Intellectual Property Office, the entire disclosure of which is incorporated by reference herein.

BACKGROUND

1. Field

Aspects of one or more embodiments relate to a battery pack.

2. Description of Related Art

In general, secondary batteries are rechargeable, unlike non-rechargeable primary batteries. Secondary batteries are used as energy sources of devices such as mobile devices, electric vehicles, hybrid electric vehicles, electric bicycles, and uninterruptible power supplies, and according to the types of external devices using secondary batteries, secondary batteries may be used as single battery cells or battery packs in which a plurality of battery cells are connected and grouped in one unit.

While small mobile devices, such as mobile phones, may operate for a certain time by using the output and capacity of a single battery, in the case of electric automobiles or hybrid automobiles, which may have large power consumption, a long driving time, and high-power driving, battery packs may be used to meet the power and capacity requirements, and an output voltage or an output current of a battery pack may increase as the number of battery cells included therein is increased.

SUMMARY

According to an aspect of one or more embodiments, a cooling structure capable of improving cooling efficiency of battery cells by cooling three surfaces of the battery cell, that is, first and second side surfaces and a bottom surface together, by using pack cases including first and second tank plates extending across the first and second side surfaces of the battery cells and a flow path plate between the first and second tank plates to face the bottom surfaces of the battery cells, is provided.

Additional aspects will be set forth, in part, in the description which follows and, in part, will be apparent from the description, or may be learned by practice of the presented embodiments of the disclosure.

According to one or more embodiments, a battery pack includes: a plurality of battery cells each including a terminal surface on which a terminal unit TU is arranged, a bottom surface opposite the terminal surface, and first and second side surfaces connecting the terminal surface to the bottom surface; and pack cases accommodating the plurality of battery cells in two rows such that the bottom surfaces face each other, and including a flow path plate which is between the bottom surfaces of the battery cells in the two rows, and including a plurality of flow paths accommodating a flow of a cooling medium, and first and second tank plates which define first and second connection tanks, respectively, that are fluidly connected to the plurality of flow paths, and which extend across the flow path plate from upper and lower portions of the flow path plate, respectively, to cover the first and second side surfaces.

In one or more embodiments, the flow path plate may face the bottom surfaces of the battery cells, and the first and second connection tanks may face the first and second side surfaces of the battery cells.

In one or more embodiments, the battery pack may further include gap fillers arranged between the bottom surfaces of the battery cells and the flow path plate and between the first and second side surfaces of the battery cells and the first and second tank plates.

In one or more embodiments, the pack case may include first and second accommodation spaces at opposite sides in a direction intersecting a row direction of the two rows, and the battery pack may include first and second rows of the two rows of the battery cells accommodated in the first and second accommodation spaces, respectively.

In one or more embodiments, outer surfaces of the first and second tank plates opposite the first and second accommodation spaces may include flat surfaces to define base surfaces of the first and second connection tanks, and inner surfaces of the first and second tank plates contacting the first and second accommodation spaces may have a gradient from inlets of the first and second accommodation spaces toward the flow path plate.

In one or more embodiments, the inner surfaces of the first and second tank plates may be inclined such that heights of the first and second accommodation spaces are gradually decreased from the inlets of the first and second accommodation spaces toward the flow path plate.

In one or more embodiments, the flow path plate and the first and second tank plates may be integrally connected to each other without a joint.

In one or more embodiments, with respect to the flow path plate, half of each of the first and second tank plates may face the first row of the battery cells, and the other half of each of the first and second tank plates may face the second row of the battery cells.

In one or more embodiments, the flow paths may extend in a direction parallel to the bottom surfaces of the battery cells so as to connect the first and second connection tanks to each other.

In one or more embodiments, the flow paths may be arranged in a row at intervals along the flow path plate.

In one or more embodiments, the flow paths may include empty spaces defining a channel shape buried in the flow path plate.

In one or more embodiments, the battery pack is configured to flow the cooling medium that is at a low temperature from the first connection tank along the flow paths to be heated through heat exchange with the battery cells to a high temperature, and discharge the cooling medium that is at the high temperature to the second connection tank.

In one or more embodiments, the first connection tank may define a flow space for the cooling medium, surrounded by side walls formed along edges of the first tank plate and a base surface of the first connection tank surrounded by the side walls formed along the edges of the first tank plate, and the second connection tank may define a flow space for the cooling medium, surrounded by side walls formed along edges of the second tank plate and a base surface of the second connection tank surrounded by the side walls formed along the edges of the second tank plate.

In one or more embodiments, the first tank plate may include inlets defined at the base surface of the first tank plate to be connected to the plurality of flow paths, and the second tank plate may include outlets defined at the base surface of the second tank plate to be connected to the plurality of flow paths.

In one or more embodiments, a plurality of inlets of the inlets and a plurality of outlets of the outlets may be arranged in rows along the flow path plate.

In one or more embodiments, the first and second connection tanks may be sealed from an outside by first and second cover plates covering the first and second tank plates, respectively.

In one or more embodiments, the first and second cover plates may be inserted between step portions defined on the side walls located along edges of the first and second tank plates, respectively.

In one or more embodiments, the first and second connection tanks may define a single non-partitioned space.

In one or more embodiments, the first tank plate may include a source unit through which the cooling medium is configured to be supplied to the first connection tank, and the second tank plate may include a sink unit through which the cooling medium is configured to be discharged from the second connection tank.

In one or more embodiments, the source unit and the sink unit may face each other in a diagonal direction across the first and second tank plates.

In one or more embodiments, the source unit and the sink unit may be located at corner positions of the first and second tank plates, respectively.

In one or more embodiments, the battery pack may be configured to supply the cooling medium that is at a low temperature through the source unit to the flow paths through the inlets arranged in a row while being radially diffused along the base surface of the first tank plate from the source unit, and to discharge the cooling medium that is at a high temperature from the flow paths through the outlets arranged in a row to be discharged to an outside while radially converging along the base surface of the second tank plate.

In one or more embodiments, the source unit and the sink unit may include connection units into which a supply pipe to supply the cooling medium and a discharge pipe to discharge the cooling medium are inserted, respectively.

In one or more embodiments, the first connection tank may connect the source unit to the plurality of inlets through the single non-partitioned space.

In one or more embodiments, the second connection tank may connect the sink unit to the plurality of outlets through the single non-partitioned space.

In one or more embodiments, first and second pack cases of the pack cases may be arranged in a row direction in which the plurality of battery cells are arranged.

In one or more embodiments, each of the first and second pack cases may include first and second accommodation spaces at opposite sides in a direction intersecting the row direction, and the battery pack may include first and second rows of the battery cells accommodated in the first and second accommodating spaces, respectively.

In one or more embodiments, the battery pack may include four rows of the battery cells including first and second rows of the battery cells accommodated in the first pack case and first and second rows of the battery cells accommodated in the second pack case.

In one or more embodiments, a connection block may be arranged between the first and second pack cases.

In one or more embodiments, the battery pack may further include: bus bars on the connection block and electrically connecting the battery cells accommodated in the first and second pack cases to each other; and output terminals electrically connected to the bus bars and supported on the connection block.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
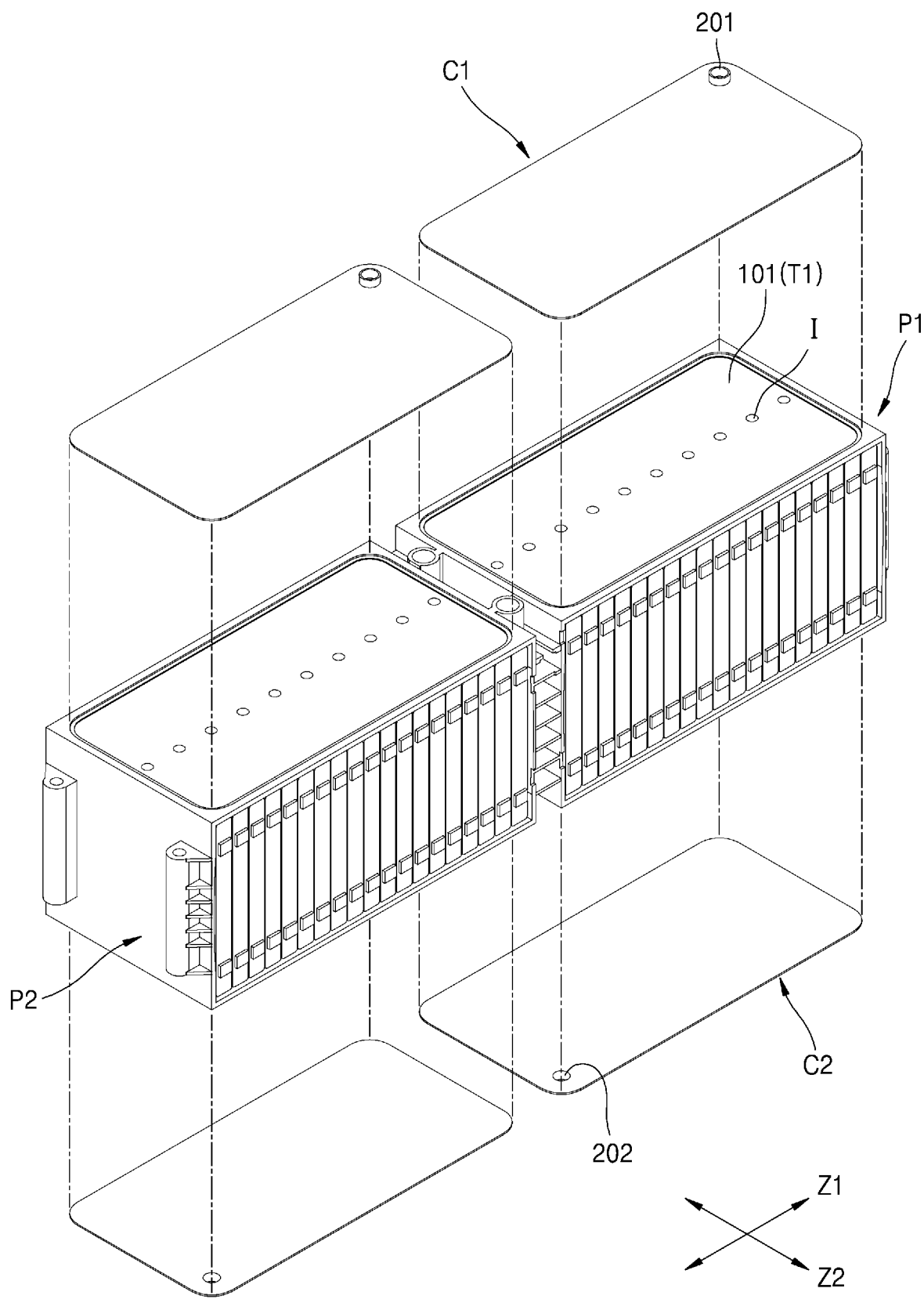
FIGS. 1 to 3 are exploded perspective views of a battery pack according to an embodiment.

Reference will now be made in further detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the singular forms "a," "an," and "the" are intended to include the plural forms as well, unless the context clearly indicates otherwise.

It is to be understood that the terms "comprise," "include," and "have" used herein specify the presence of stated features or components, but do not preclude the presence or addition of one or more other features or components.

Sizes of components in the drawings may be exaggerated for convenience of description. In other words, since the sizes and thicknesses of components in the drawings may be arbitrarily illustrated for convenience of description, the following embodiments are not limited thereto.

It is to be understood that when a layer, region, or component is referred to as being "connected to" another layer, region, or component, it may be directly connected to the other layer, region, or component or may be indirectly connected to the other layer, region, or component with one or more intervening layers, regions, or components interposed therebetween. For example, it is to be understood that when a layer, region, or component is referred to as being "electrically connected to" another layer, region, or component, it may be directly electrically connected to the other layer, region, or component or may be indirectly electrically connected to the other layer, region, or component with one or more intervening layers, regions, or components interposed therebetween.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Herein, a battery pack according to one or more embodiments will be described with reference to the accompanying drawings.

Figure 2:
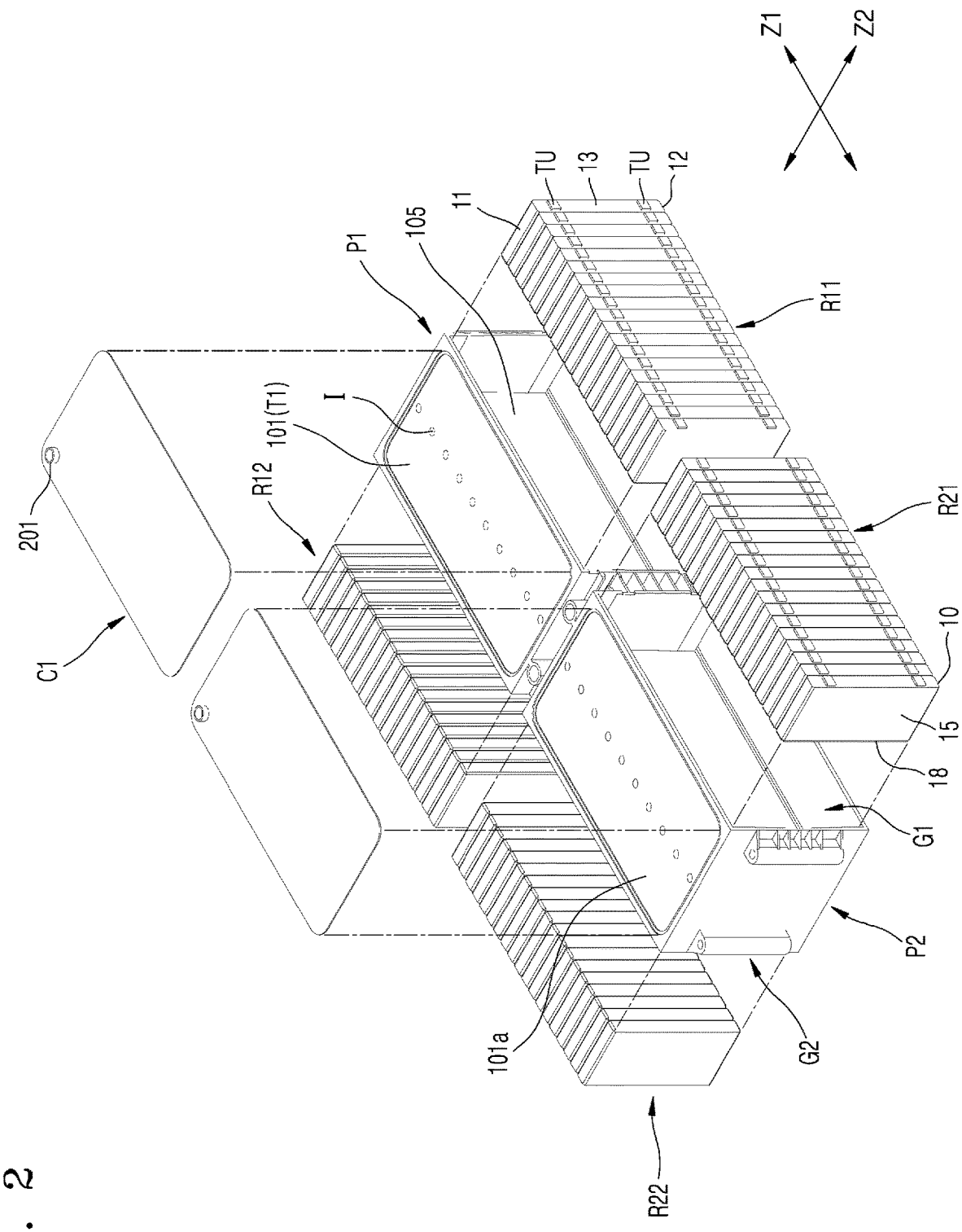
Figure 3:
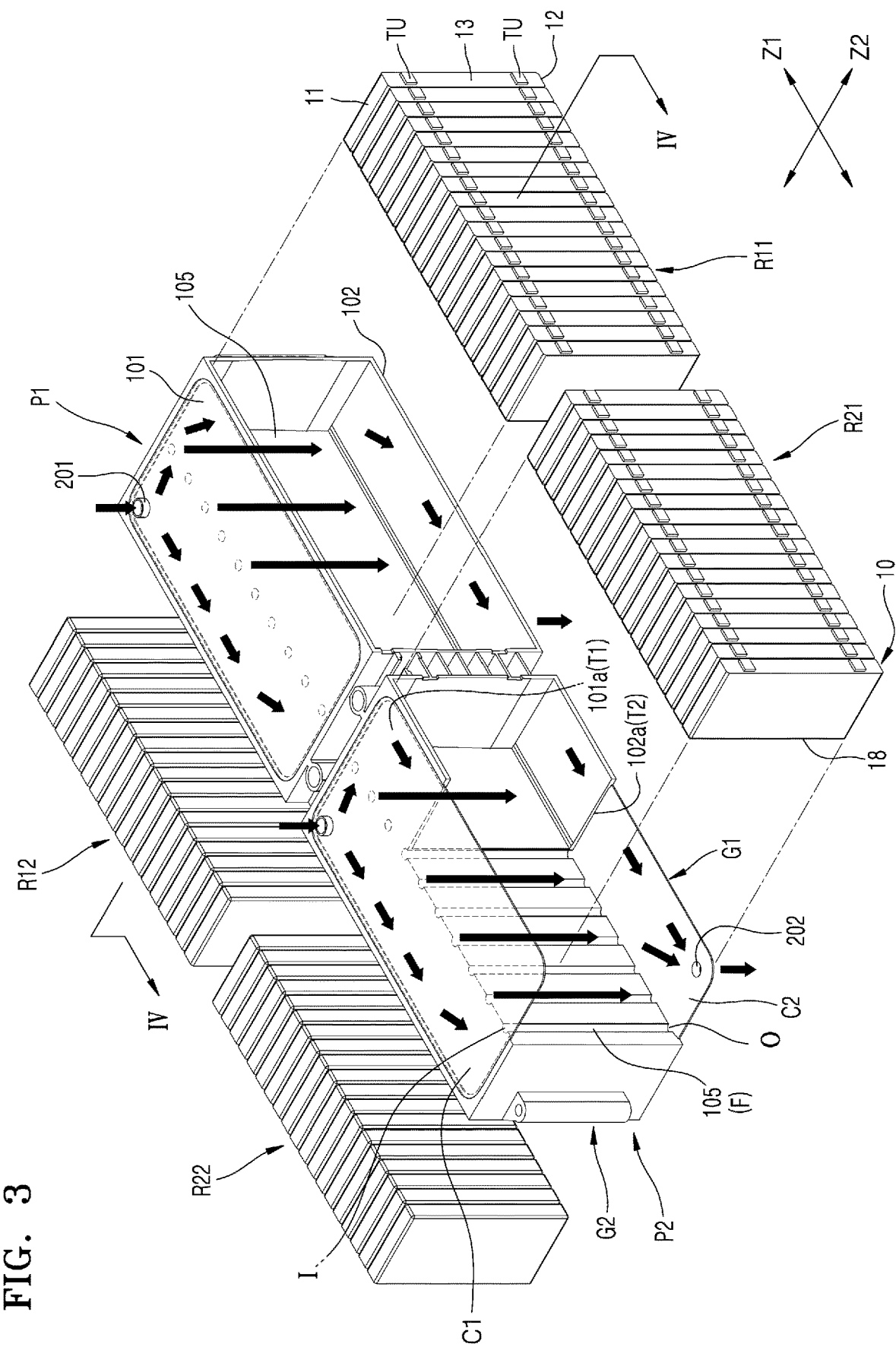
Figure 4:
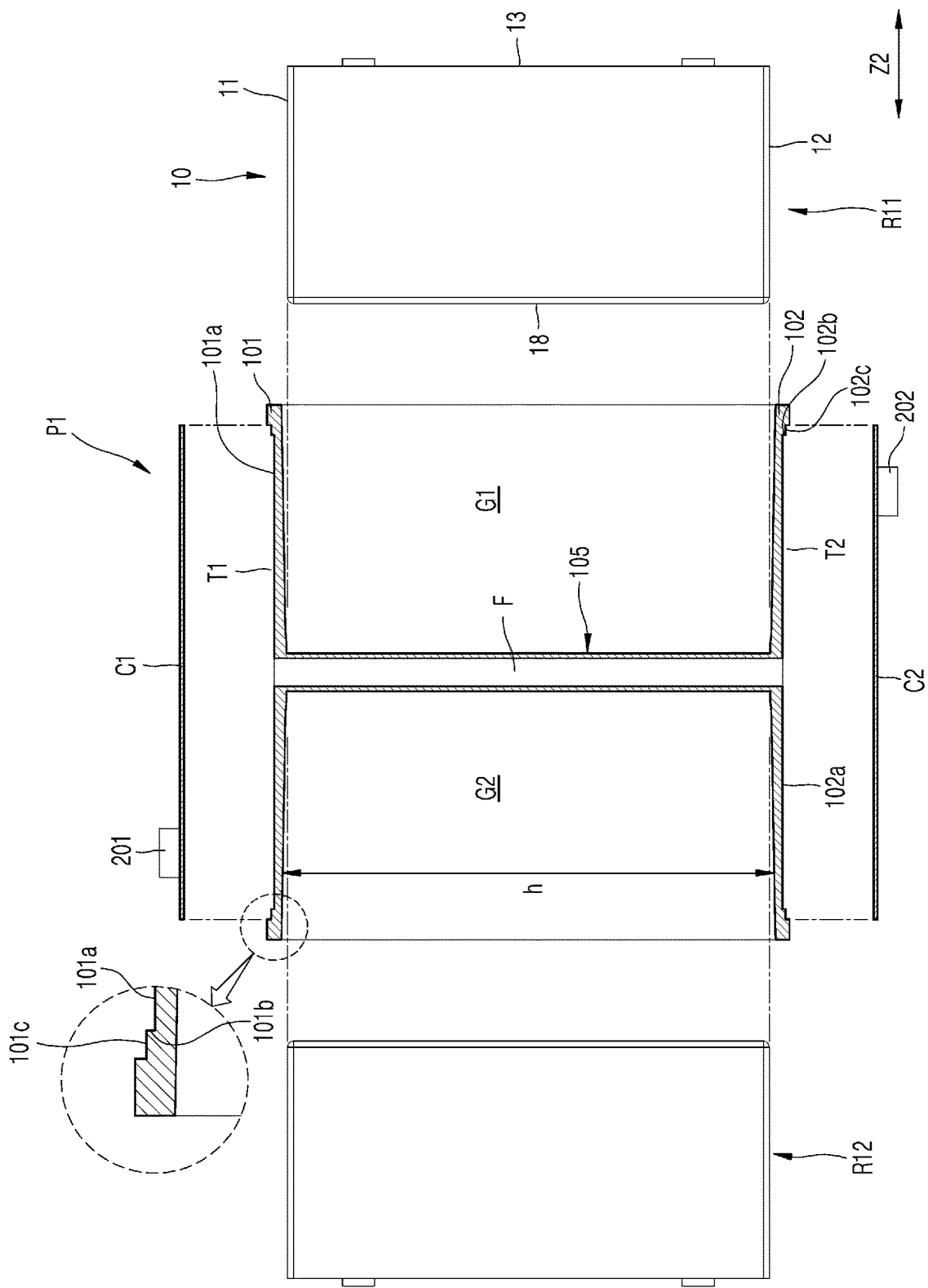
FIGS. 4 and 5 are cross-sectional views taken along the line IV-IV of FIG. 3.
Figure 5:
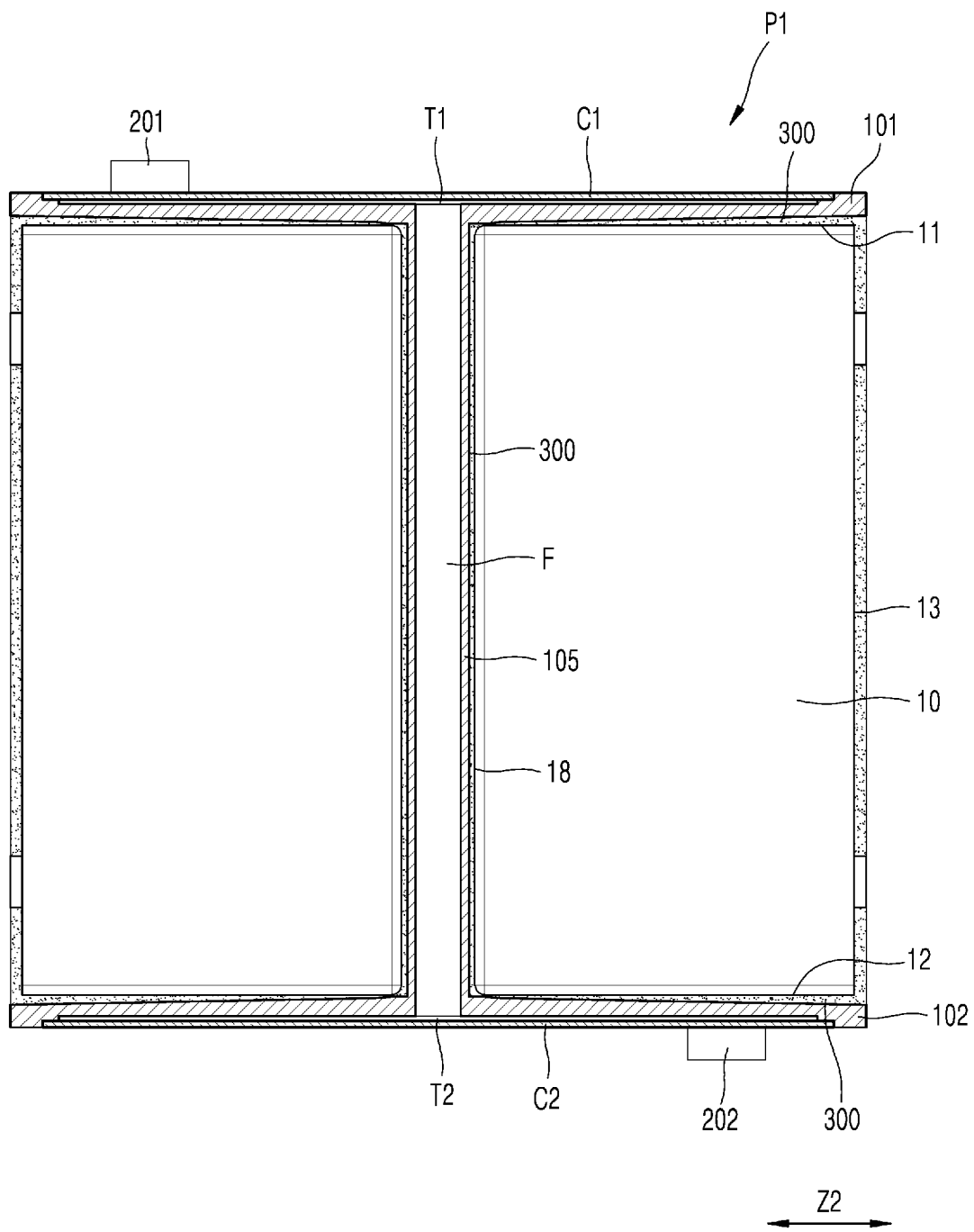
Figure 6A:
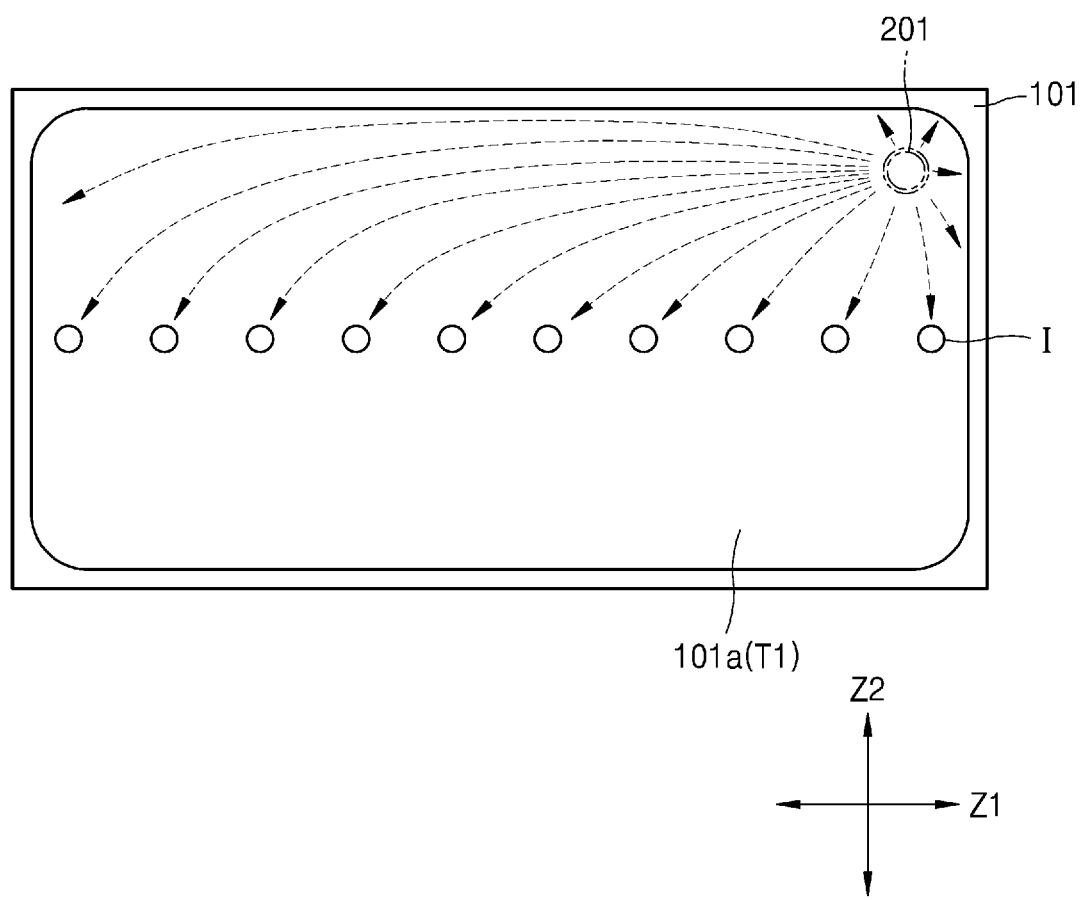
FIG. 6A is a diagram schematically illustrating a flow of a cooling medium introduced from a source unit to a plurality of inlets in a first connection tank.
Figure 6B:
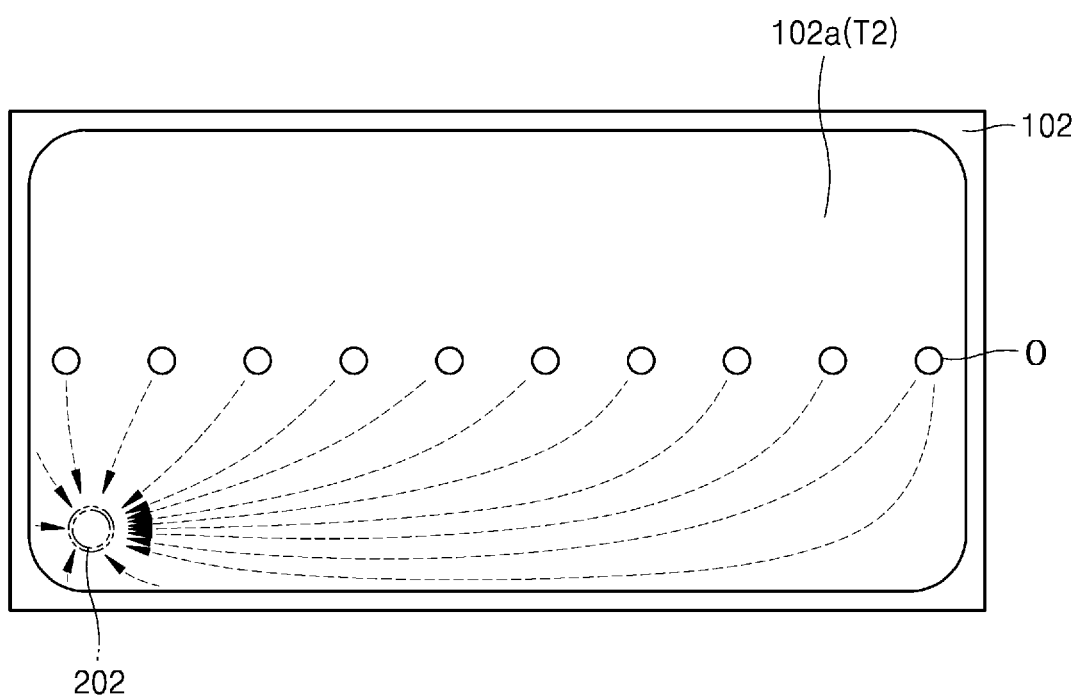
FIG. 6B is a diagram schematically illustrating a flow of a cooling medium introduced from a plurality of outlets to a sink unit in a second connection tank.

FIGS. 1 to 3 are exploded perspective views of a battery pack according to an embodiment; FIGS. 4 and 5 are cross-sectional views taken along the line IV-IV of FIG. 3; FIG. 6A is a diagram schematically illustrating a flow of a cooling medium introducing from a source unit to a plurality of inlets in a first connection tank; and FIG. 6B is a diagram schematically illustrating a flow of a cooling medium introducing from a plurality of outlets to a sink unit in a second connection tank.

Referring to FIGS. 1 to 3, a battery pack may include a plurality of battery cells 10 each including a terminal surface 13 on which a terminal unit TU is formed, a bottom surface 18 opposite the terminal surface 13, and first and second side surfaces 11 and 12 connecting the terminal surface 13 to the bottom surface 18. In addition, the battery pack may include pack cases P1 and P2 accommodating the plurality of battery cells 10 in two rows such that the bottom surfaces 18 face each other, and the pack cases P1 and P2 may include a flow path plate 105 which is between the bottom surfaces 18 of the battery cells 10 in the two rows, and includes a plurality of flow paths F accommodating a flow of a cooling medium, and first and second tank plates 101 and 102 which form first and second connection tanks T1 and T2, respectively, that are fluidly connected to the plurality of flow paths F, and which extend across the flow path plate 105 from upper and lower portions of the flow path plate 105, respectively, to cover the first and second side surfaces 11 and 12.

The battery cell 10 may include the terminal surface 13 on which the terminal unit TU is formed, the bottom surface 18 opposite the terminal surface 13, main surfaces 15 connecting the terminal surface 13 to the bottom surface 18 and occupying a relatively large area, and the first and second side surfaces 11 and 12 connecting the terminal surface 13 to the bottom surface 18 and occupying a relatively small area. The terminal unit TU of the battery cell 10 may include first and second terminals having different polarities, and the first and second terminals may be spaced apart from each other on the terminal surface 13. The main surfaces 15 may be formed as a pair to face each other.

The battery cells 10 may be arranged in a row such that the main surfaces 15 of the battery cells adjacent to each other 10 face each other. Throughout the present specification, a row direction Z1 may refer to a direction in which the battery cells 10 are arranged, and may refer to a direction in which the battery cells 10 are arranged in a row such that the main surfaces 15 of the battery cells 10 adjacent to each other face each other.

The battery pack according to an embodiment may include a plurality of rows of the battery cells 10 arranged such that the main surfaces 15 of the battery cells 10 adjacent to each other in a row directly face each other. As will be described below, in an embodiment, the battery cells 10 in the rows may be accommodated in first and second accommodation spaces G1 and G2, respectively, in each of the pack cases P1 and P2. For example, the pack cases P1 and P2 may include the first and second accommodation spaces G1 and G2 that are spatially separated from each other, and the battery cells 10 in different rows may be accommodated in the first and second accommodation spaces G1 and G2, respectively.

In an embodiment, first and second pack cases P1 and P2 may be arranged in the row direction Z1. Here, each of the first and second pack cases P1 and P2 may include the first and second accommodation spaces G1 and G2 at opposite sides in a direction Z2 intersecting the row direction Z1 in which the plurality of battery cells 10 are arranged, and may include first rows R11 and R21, and second rows R12 and R22 of the battery cells accommodated in the first and second accommodation spaces G1 and G2, respectively. The first rows R11 and R21 of the battery cells accommodated in the first and second pack cases P1 and P2, respectively, may be arranged such that the main surfaces 15 of the battery cells 10 adjacent to each other directly face each other, and the first rows R11 and R21 of the battery cells of the first and second pack cases P1 and P2 may constitute two rows of the battery cells 10. For example, the first row R11 of the battery cells accommodated in the first pack case P1 and the first row R21 of the battery cells accommodated in the second pack case P2 may constitute two rows of the battery cells 10 arranged in the row direction Z1 and separated from each other, and may not constitute one row of the battery cells 10 continuously arranged in the row direction Z1.

Similarly, the second rows R12 and R22 of the battery cells accommodated in the first and second pack cases P1 and P2, respectively, may be arranged such that the main surfaces 15 of the battery cells 10 adjacent to each other directly face each other, and the second rows R12 and R22 of the battery cells of the first and second pack cases P1 and P2 may constitute two rows of the battery cells 10. For example, the second row R12 of the battery cells accommodated in the first pack case P1 and the second row R22 of the battery cells accommodated in the second pack case P2 may constitute two rows of the battery cells 10 arranged in the row direction Z1 and separated from each other, and may not constitute one row of the battery cells 10 continuously arranged in the row direction Z1. In other words, in an embodiment, the battery pack may include a total of four rows of the battery cells 10 including the first and second rows R11 and R12 of the battery cells accommodated in the first pack case P1 and the first and second rows R21 and R22 of the battery cells accommodated in the second pack case P2.

In an embodiment, the first and second rows R11 and R12 of the battery cells 10 of the first pack case P1 may be arranged in the direction Z2 intersecting the row direction Z1, for example, in the direction Z2 perpendicular to the row direction Z1, such that the bottom surfaces 18 of the battery cells 10 adjacent to each other face each other. Similarly, the first and second rows R21 and R22 of the battery cells 10 of the second pack case P2 may be arranged in the direction Z2 intersecting the row direction Z1, for example, in the direction Z2 perpendicular to the row direction Z1, such that the bottom surfaces 18 of the battery cells 10 adjacent to each other face each other.

Herein, further description will be provided with respect to the first pack case P1. However, because the first and second pack cases P1 and P2 may have substantially the same structure, the technical features of the first pack case P1 may be substantially equally applied to the second pack case P2.

The first pack case P1 may include the flow path plate 105 between the bottom surfaces 18 of the first and second rows R11 and R12 of the battery cells 10, and the first and second tank plates 101 and 102 which form the first and second connection tanks T1 and T2, respectively, that are fluidly connected to the plurality of flow paths F, and which extend across the flow path plate 105 from the upper and lower portions of the flow path plate 105, respectively, to cover the first and second side surfaces 11 and 12 of the battery cells 10 in the first and second rows R11 and R12. In an embodiment, the upper and lower portions of the flow path plate 105 may refer to one end and another end of the flow path plate 105 in a height direction in which the first and second side surfaces 11 and 12 of the battery cells 10 face each other.

More specifically, the first and second accommodating spaces G1 and G2 in which the first and second rows R11 and R12 of the battery cells are accommodated may be formed in the first pack case P1. Here, the first and second accommodation spaces G1 and G2 may be surrounded by the flow path plate 105 between the first and second rows R11 and R12 of the battery cells and the first and second tank plates 101 and 102 extending across the flow path plate 105, thereby forming accommodation spaces in which the battery cells 10 are accommodated. For example, in the first and second accommodation spaces G1 and G2, the flow path plate 105 may face the bottom surfaces 18 of the battery cells 10, and the first and second tank plates 101 and 102 may face the first and second side surfaces 11 and 12 of the battery cells 10. For example, with respect to the flow path plate 105, half of each of the first and second tank plates 101 and 102 may face the first row R11 of the battery cells 10, and the other half of each of the first and second tank plates 101 and 102 may face the second row R12 of the battery cells 10.

Referring to FIG. 4, outer surfaces of the first and second tank plates 101 and 102 opposite the first and second accommodation spaces G1 and G2 may include flat surfaces to form base surfaces 101a and 102a of the first and second connection tanks T1 and T2, respectively, and inner surfaces of the first and second tank plates 101 and 102 facing the first and second accommodation spaces G1 and G2 may have a gradient from inlets of the first and second accommodation spaces G1 and G2 toward the flow path plate 105. More specifically, the inner surfaces of the first and second tank plates 101 and 102 may be inclined such that heights h of the first and second accommodation spaces G1 and G2 are gradually decreased from the inlets of the first and second accommodation spaces G1 and G2 toward the flow path plate 105. Here, the heights h of the first and second accommodation spaces G1 and G2 may refer to heights in a direction in which the first and second side surfaces 11 and 12 of the battery cells 10 accommodated in the first and second accommodation spaces G1 and G2 face each other.

In an embodiment, the first pack case P1 may be integrally formed by a casting process, and the flow path plate 105 and the first and second tank plates 101 and 102 that constitute the first pack case P1 may be integrally connected to each other without a joint. In an embodiment, the entire pack cases P1 and P2 may be integrally formed by a casting process, and the first and second pack cases P1 and P2 may be integrally connected without a joint.

In an embodiment, the inner surfaces of the first and second tank plates 101 and 102 may be inclined, and, accordingly, the first and second tank plates 101 and 102 may be easily separated from a mold (not shown). In an embodiment, the entire pack cases P1 and P2 provide cooling of the battery cells 10, and may be integrally formed of a metal material having excellent thermal conductivity, for example, aluminum or an aluminum alloy. In an embodiment, first and second cover plates C1 and C2 coupled onto the first and second pack cases P1 and P2 may be formed of aluminum or an aluminum alloy, the first pack case P1 and the first and second cover plates C1 and C2 may be separately formed and then coupled to each other by welding or the like, and, similarly, the second pack case P2 and first and second cover plates C1 and C2 may be separately formed and then coupled to each other by welding or the like. In an embodiment, the first and second pack cases P1 and P2 and the first and second cover plates C1 and C2 may be firmly coupled to each other by welding between the same materials.

Referring to FIG. 5, the battery cells 10 may be accommodated in the first pack case P1 while the bottom surfaces 18 and the first and second side surfaces 11 and 12 of the battery cells 10 are surrounded by the first pack case P1. In this case, the bottom surfaces 18 and the first and second side surfaces 11 and 12 of the battery cells 10 may face the flow path plate 105 and the first and second tank plates 101 and 102, respectively, and gap fillers 300 may be arranged between the bottom surfaces 18 of the battery cells 10 and the flow path plate 105 and between the first and second side surfaces 11 and 12 of the battery cells 10 and the first and second tank plates 101 and 102 to firmly fix the battery cells 10, and heat transfer may be facilitated by the gap fillers 300 without a gap between the battery cells 10 and the first pack case P1. In an embodiment, thermal grease may be used as the gap fillers 300.

Referring to FIGS. 3 to 5, the flow path plate 105 may be between the bottom surfaces 18 of the battery cells 10 in the first and second rows R11, R12, R21, and R22. The flow path plate 105 may face the bottom surfaces 18 of the battery cells 10 in the first and second rows R11, R12, R21, and R22 to provide cooling of the bottom surfaces 18 of the battery cells 10 in the first and second rows R11, R12, R21, and R22, and the plurality of flow paths F may be formed in the flow path plate 105. In this case, the plurality of flow paths F in the flow path plate 105 may be fluidly connected to the first and second connection tanks T1 and T2 in the upper and lower portions of the flow path plate 105.

In an embodiment, the flow path plate 105 may face the bottom surfaces 18 of the battery cells 10, the first and second connection tanks T1 and T2 may face the first and second side surfaces 11 and 12 of the battery cells 10, and, thus, the first and second side surfaces 11 and 12 and the bottom surfaces 18 of the battery cells 10 may be cooled together along paths for the cooling medium formed by a fluid connection of the flow path plate 105 and the first and second connection tanks T1 and T2, and, accordingly, heat dissipation performance may be improved compared to that of a comparative example in which only the bottom surfaces of the battery cells are cooled. In other words, in an embodiment, the first and second side surfaces 11 and 12 and the bottom surfaces 18 of the battery cells 10 may be cooled together, and, thus temperature deviations between the battery cells 10 may be reduced, local deterioration of the battery cells 10 may be alleviated, and, accordingly, deterioration in performance and an operational life of the battery pack due to the local deterioration may be prevented or substantially prevented.

Table 1 shows results of comparing heat dissipation performance in the battery pack of an embodiment in which the first and second side surfaces 11 and 12 and the bottom surfaces 18 of the battery cells 10 are cooled together, and in a comparative example in which only the bottom surfaces of the battery cells are cooled. For reference, Table 1 summarizes the results obtained by simulation using computational analysis.

TABLE 1

| | Cell case maximum temperature | Cell case minimum temperature | Cell case temperature deviation | Electrode assembly Highest temperature | Electrode assembly Lowest temperature | Electrode assembly Temperature deviation |
|---|---|---|---|---|---|---|
| Embodiment | 45.5° C. | 32.5° C. | 13.0° C. | 46.0° C. | 34.0° C. | 12.0° C. |
| Comparative example | 49.2° C. | 34.4° C. | 14.8° C. | 49.4° C. | 36.8° C. | 12.6° C. |

In Table 1, a cell case may refer to a can as an exterior material of the battery cell 10 surrounding an electrode assembly. From the comparison results of Table 1, it is seen that the temperature deviations in both the cell case and the electrode assembly in an embodiment are reduced as compared with those of the comparative example, and it may also be seen that local deterioration is directly relevant to the deterioration in the performance and the operating life of the battery pack may be remarkably alleviated as compared with the comparative example.

Describing in further detail the technical features of the flow path plate 105 with reference to FIG. 3, the flow path plate 105 may include the plurality of flow paths F fluidly connected to the first and second connection tanks T1 and T2. The plurality of flow paths F may extend in a direction parallel to the bottom surfaces 18 of the battery cells 10 so as to connect the first and second connection tanks T1 and T2 to each other, thereby providing the paths for the cooling medium that cools the battery cells 10. In an embodiment, the plurality of flow paths F may be intermittently arranged along the flow path plate 105, and, for example, the adjacent flow paths F may be arranged in a row at intervals along the flow path plate 105. In an embodiment, the flow path plate 105 may extend in the row direction Z1 across the first and second rows R11, R12, R21, and R22 of the battery cells 10 arranged in the row direction Z1, and, in this sense, the fact that the plurality of flow paths F are arranged along the flow path plate 105 may mean that the plurality of flow paths F are arranged in the row direction Z1 in which the flow path plate 105 extends.

In an embodiment, the plurality of flow paths F may be buried in the flow path plate 105. For example, the plurality of flow paths F may be empty spaces having a channel shape in the flow path plate 105. The flow paths F may accommodate the flow of the cooling medium, and the cooling medium having a low temperature flowing from the first connection tank T1 may flow along the flow paths F and may be heated through heat exchange with the battery cells 10 to have a high temperature, and the cooling medium having the high temperature may be discharged to the second connection tank T2.

The first and second tank plates 101 and 102 may be arranged at both ends of the flow path plate 105, respectively, to extend across the flow path plate 105. In an embodiment, the first and second tank plates 101 and 102 may cover the first and second side surfaces 11 and 12 of the battery cells 10 while extending across the flow path plate 105 from the upper and lower portions of the flow path plate 105.

The first tank plate 101 may include a plurality of inlets I formed at the base surface 101a of the first tank plate 101 to be connected to the plurality of flow paths F of the flow path plate 105 while extending across the flow path plate 105, and the second tank plate 102 may include a plurality of outlets O formed at the base surface 102a of the second tank plate 102 to be connected to the plurality of flow paths F of the flow path plate 105 while extending across the flow path plate 105.

Referring to FIGS. 3, 6A, and 6B, in an embodiment, a plurality of inlets I and a plurality of outlets O may be arranged in the first and second tank plates 101 and 102, respectively, in rows along the flow path plate 105. For example, the plurality of inlets I and the plurality of outlets O may be arranged in the row direction Z1 in which the flow path plate 105 extends. The inlets I and the outlets O of the first and second tank plates 101 and 102 may be connected to the plurality of flow paths F in the flow path plate 105 to provide openings through which the cooling medium having a low temperature is introduced and openings through which the cooling medium having a high temperature is discharged. In an embodiment, the plurality of flow paths F in the flow path plate 105 may provide paths for the cooling medium between the inlets I and the outlets O of the first and second tank plates 101 and 102.

Referring to FIG. 4, the first tank plate 101 may include side walls 101b formed along edges of the first tank plate 101 and the base surface 101a surrounded by the side walls 101b, and may form the first connection tank T1 surrounded by the side walls 101b and the base surface 101a of the first tank plate 101. Similarly, the second tank plate 102 may include side walls 102b formed along edges of the second tank plate 102 and the base surface 102a surrounded by the side walls 102b, and may form the second connection tank T2 surrounded by the side walls 102b and the base surface 102a of the second tank plate 102. In other words, the first and second connection tanks T1 and T2 may form flow spaces for the cooling medium, surrounded by the side walls 101b and 102b of the first and second tank plates 101 and 102 and the base surfaces 101a and 102a surrounded by the side walls 101b and 102b of the first and second tank plates 101 and 102.

The first and second connection tanks T1 and T2 may be fluidly connected to the flow path plate 105, may supply the cooling medium having a low temperature to the flow path plate 105 or may receive the cooling medium having a high temperature discharged from the flow path plate 105, and may buffer the flow of the cooling medium such that the cooling medium smoothly flows in the flow path plate 105.

The plurality of inlets I and the plurality of outlets O may be formed in the base surfaces 101a and 102a of the first and second tank plates 101 and 102, respectively. For example, the plurality of inlets I and the plurality of outlets O may be formed in rows on the first and second tank plates 101 and 102, respectively, and may be arranged in the row direction Z1 in which the flow path plate 105 extends.

Referring to FIG. 4, in an embodiment, step portions 101c and 102c may be formed on the side walls 101b and 102b of the first and second tank plates 101 and 102, respectively, and the first and second cover plates C1 and C2 covering the first and second tank plates 101 and 102 may be mounted on the step portions 101c and 102c, respectively. For example, the first and second tank plates 101 and 102 may include the step portions 101c and 102c extending from the side walls 101b and 102b, respectively, in a width direction Z2 to form steps from the side walls 101b and 102b in the width direction Z2, and the step portions 101c and 102c may provide regions in which the first and second cover plates C1 and C2 are seated and assembled.

In an embodiment, the first and second connection tanks T1 and T2 may be sealed from the outside by first and second cover plates C1 and C2 covering the first and second tank plates 101 and 102, respectively. The first and second cover plates C1 and C2 may be coupled onto the first and second tank plates 101 and 102, respectively, and may be coupled to the step portions 101c and 102c of the first and second tank plates 101 and 102, respectively, by welding or the like after being seated to be fitted to the step portions 101c and 102c formed along the edges of the first and second tank plates 101 and 102, respectively.

Referring to FIGS. 3, 6A, and 6B, in an embodiment, the first and second connection tanks T1 and T2 may be formed as a single non-partitioned space. Here, the fact that the first and second connection tanks T1 and T2 are formed as the single non-partitioned space may mean that the first and second connection tanks T1 and T2 do not form two or more different spaces that are fluidly separated from each other. For example, the first connection tank T1 may connect a source unit 201 to the plurality of inlets I through the single non-partitioned space. Similarly, the second connection tank T2 may connect a sink unit 202 to the plurality of outlets O through the single non-partitioned space. Further detailed technical features of the source unit 201 and the sink unit 202 will be described later.

In an embodiment, the first and second connection tanks T1 and T2 may mediate a one-to-multiple fluidic connection through a single open space that is not partitioned or disconnected. As described above, in an embodiment, leakage points of the cooling medium may be significantly reduced by forming the one-to-multiple fluidic connection through the single open space, rather than through a plurality of fluid paths having closed cross-sections to be fluidly separated from each other. On the other hand, in a case in which the one-to-multiple fluidic connection is formed by using a plurality of tubes having closed cross-sections, the leakage points may be increased and heat dissipation performance may be deteriorated. For example, in an embodiment, the first and second connection tanks T1 and T2 may be formed as the single open space, and, thus, the heat dissipation performance may be improved by utilizing latent heat of vaporization of the cooling medium. For example, the first and second connection tanks T1 and T2 may be formed as the single open space, and, thus, a relatively large non-partitioned space may be secured and a vaporization space for the cooling medium may be provided.

The source unit 201 through which the cooling medium is supplied from the outside of the battery pack, and the sink unit 202 through which the cooling medium is discharged from the battery pack to the outside may be formed at the first and second cover plates C1 and C2, respectively. The cooling medium having a low temperature may be supplied from the outside of the battery pack to the first connection tank T1 through the source unit 201, and the cooling medium having a high temperature may be discharged from the second connection tank T2 to the outside of the battery pack through the sink unit 202. More specifically, the cooling medium having a low temperature supplied through the source unit 201 may be supplied to the flow path plate 105 through the plurality of inlets I arranged in a row while being radially diffused along the base surface 101a of the first tank plate 101 from the source unit 201, and the cooling medium having a high temperature discharged from the flow path plate 105 may be discharged through the plurality of outlets O arranged in a row, and may be discharged to the outside through the sink unit 202 while being radially converged along the base surface 102a of the second tank plate 102. In an embodiment, the fact that the cooling medium is radially diffused or radially converged may mean that the cooling medium is diffused in all directions around the source unit 201 or is converged from all directions around the sink unit 202, on the base surfaces 101a and 102a of the first and second tank plates 101 and 102 forming the single open space (corresponding to the first and second connection tanks T1 and T2), respectively.

In an embodiment, a supply pipe (not shown) for supplying the cooling medium having a low temperature and a discharge pipe (not shown) for discharging the cooling medium having a high temperature may be connected to the source unit 201 and the sink unit 202, respectively, and the source unit 201 and the sink unit 202 may include connection units into which the supply pipe and the discharge pipe are inserted, respectively. The source unit 201 and the sink unit 202 may be formed on the first and second cover plates C1 and C2, respectively, and the connection units of the source unit 201 and the sink unit 202 may be formed to protrude from the first and second cover plates C1 and C2 in an outward direction opposite the first and second tank plates 101 and 102, respectively.

In an embodiment, the source unit 201 and the sink unit 202 may be fluidly connected to each other through a cooling circuit (not shown) having a shape of a closed loop, and the source unit 201 and the sink unit 202 may be fluidly connected to each other through a heat exchanger (not shown) connected between the source unit 201 and the sink unit 202 in the cooling circuit. For example, the cooling medium having a high temperature heated through the heat exchange with the battery cells 10 may flow into the heat exchanger (not shown) after being discharged through the sink unit 202, and the cooling medium having a low temperature cooled in the heat exchanger (not shown) may flow into the pack cases P1 and P2 through the source unit 201, and, thus, the cooling medium may circulate the cooling circuit (not shown) to which the source unit 201 and the sink unit 202 are fluidly connected through the heat exchanger (not shown).

In an embodiment, the source unit 201 and the sink unit 202 may be formed on the first and second cover plates C1 and C2, respectively, and may face each other in a diagonal direction across the first and second cover plates C1 and C2. In an embodiment, the first and second cover plates C1 and C2 may have a substantially rectangular shape including a pair of long sides facing each other and a pair of short sides facing each other, and the source unit 201 and the sink unit 202 may face each other in the diagonal direction across the first and second cover plates C1 and C2. However, in various embodiments, the first and second cover plates C1 and C2 may have a square shape or another suitable shape.

In an embodiment, the fact that the source unit 201 and the sink unit 202 face each other in the diagonal direction across the first and second cover plates C1 and C2 may mean that the source unit 201 and the sink unit 202 may be formed at positions on the first and second cover plates C1 and C2, respectively, to be maximally or substantially maximally spaced apart from each other.

In an embodiment, the source unit 201 and the sink unit 202 may be formed at corner positions of the first and second cover plates C1 and C2, respectively, to be maximally or substantially maximally spaced apart from each other in the diagonal direction. The source unit 201 through which the cooling medium having a low temperature is supplied and the sink unit 202 through which the cooling medium having a high temperature is discharged may be spaced apart from each other, such that balanced pressure differences may be induced with respect to the flow paths F at different positions along the flow path plate 105.

The first cover plate C1 and the first tank plate 101 may face each other with a gap corresponding to the first connection tank T1 interposed therebetween, and, in this case, distances between the source unit 201 formed at the corner position of the first cover plate C1 and the inlets I arranged in a row on the first tank plate 101 may be different from each other according to positions of the inlets I. Similarly, the second cover plate C2 and the second tank plate 102 may face each other with a gap corresponding to the second connection tank T2 interposed therebetween, and, in this case, distances between the sink unit 202 formed at the corner position of the second cover plate C2 and the outlets O arranged in a row on the second tank plate 102 may be different from each other according to positions of the outlets O. In this case, the pressure difference that forces the flow of the cooling medium in any one flow path F may correspond to a pressure difference between the inlet I and the outlet O connected to the corresponding flow path F, and the pressure difference between the inlet I and the outlet O may vary according to a distance between the inlet I and the source unit 201 and a distance between the outlet O and the sink unit 202, and, in an embodiment, the balanced pressure differences with respect to the plurality of flow paths F arranged in a row along the flow path plate 105 may be generated by the source unit 201 and the sink unit 202 maximally or substantially maximally spaced apart from each other in the diagonal direction.

In the embodiment illustrated in FIGS. 4, 6A, and 6B, the source unit 201 and the sink unit 202 may be formed at the corner positions of the first and second cover plates C1 and C2, respectively, to be maximally or substantially maximally spaced apart from each other in the diagonal direction. In the present embodiment, the source unit 201 and the sink unit 202 may be formed at selected corners of the first and second cover plates C1 and C2, respectively. In various embodiments, a pair of source units 201 and a pair of sink units 202 may be formed at two facing corner positions of the first and second cover plates C1 and C2, respectively, and, in an embodiment, the pair of source units 201 may be formed at the two facing corner positions of the first cover plate C1, and, similarly, the pair of sink units 202 may be formed at the two facing corner positions of the second cover plate C2. As described above, the pair of source units 201 through which the cooling medium having a low temperature is supplied may be formed the corner positions facing each other in the diagonal direction on the first cover plate C1, and, thus, a temperature of the cooling medium having a low temperature supplied to the flow paths F may be uniformly or substantially uniformly maintained without deviations according to a position of each flow path F. For example, the cooling medium having a low temperature supplied through the pair of source units 201 facing each other in the diagonal direction may be mixed with each other to alleviate the deviations according to the positions of the flow paths F and supply the cooling medium having a uniform or substantially uniform temperature without the deviations according to the positions of the flow paths F.

Similarly, the pair of sink units 202 through which the cooling medium having a high temperature is discharged may be formed at the corner positions of facing each other in the diagonal direction on the second cover plate C2, and, thus, a temperature of the cooling medium having a high temperature discharged through the flow paths F may be uniformly or substantially uniformly maintained without the deviations according to the positions of the flow paths F, and, accordingly, the temperature deviations in the cooling medium according to the positions of the flow paths F may be removed, and uniform or substantially uniform heat dissipation may be provided for the battery cells 10 at different positions.

Figure 7:
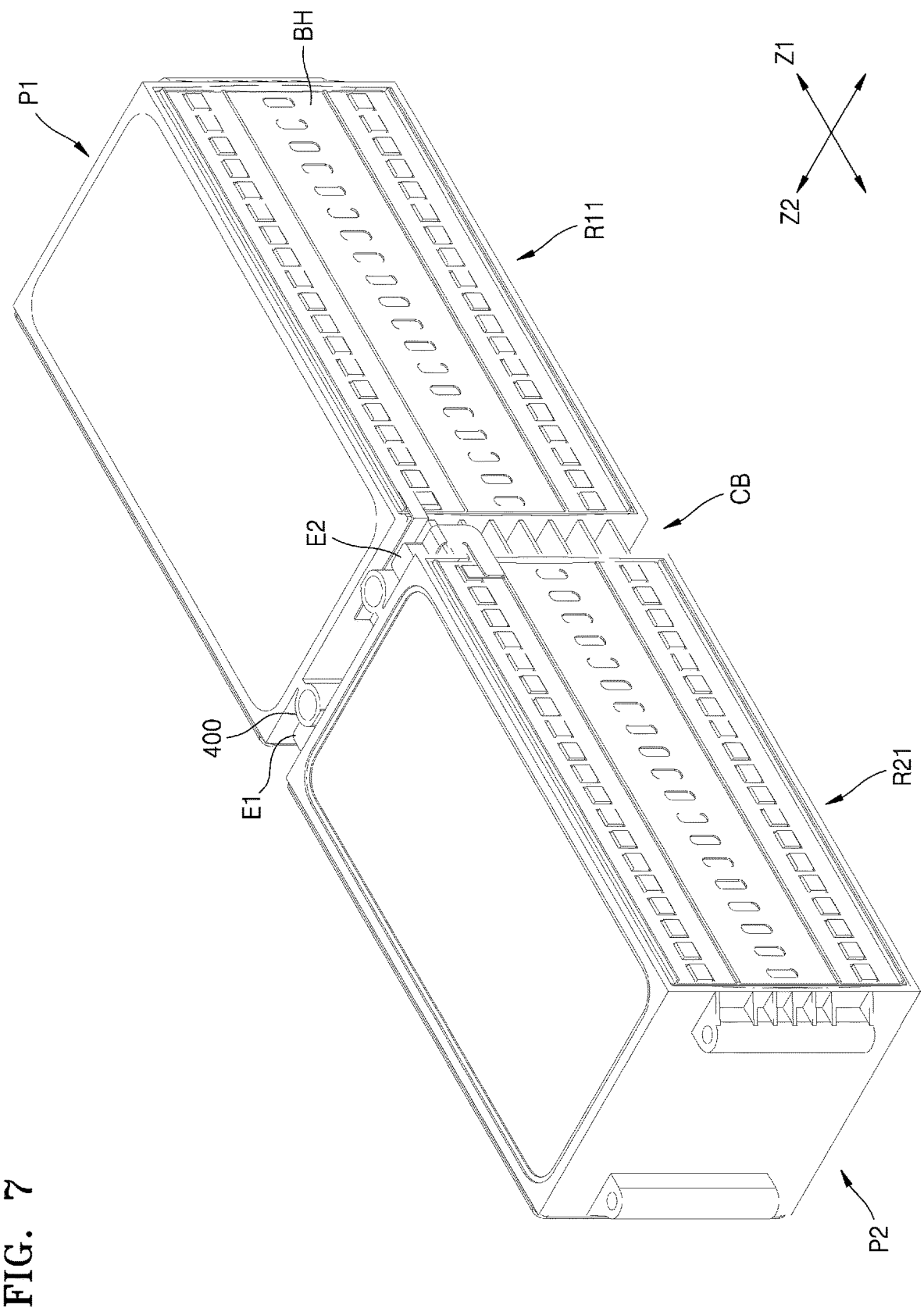
FIG. 7 is a perspective view illustrating a modified embodiment of the battery pack of FIG. 1.

FIG. 7 is a perspective view illustrating an embodiment modified from the battery pack of FIG. 1. In the embodiment of FIG. 7, bus bars (not shown) may be arranged on the terminal surfaces 13 of the battery cells 10 assembled in the first and second pack cases P1 and P2. The bus bar (not shown) may mediate an electrical connection between different battery cells 10. Here, a bus bar holder BH may be arranged between the terminal surfaces 13 of the battery cells 10 and the bus bars (not shown). The bus bar holder BH may hold an assembly position of the bus bars (not shown) and may block electrical interference between the battery cells 10 and the bus bars (not shown).

Figure 8:
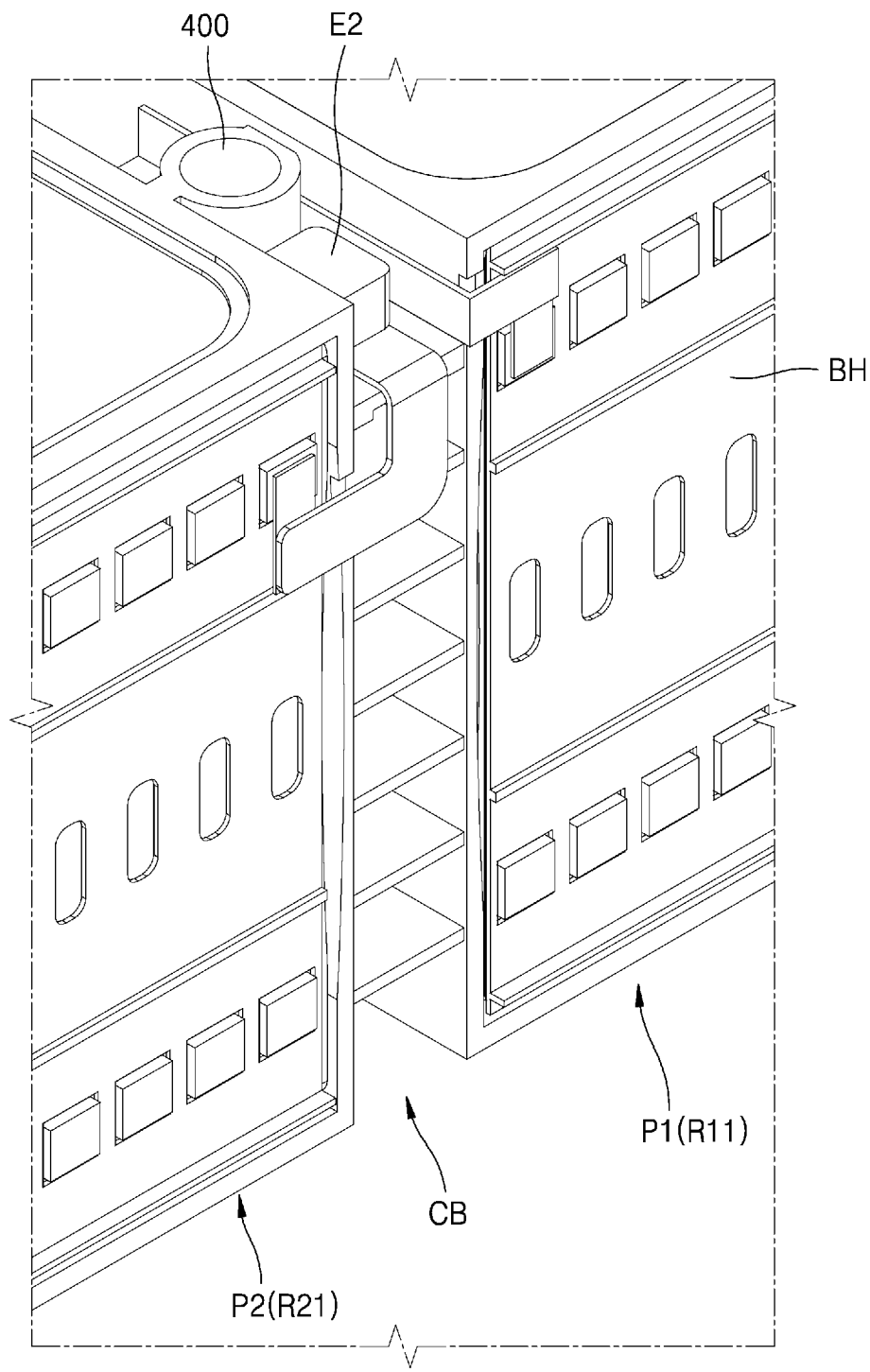
FIGS. 8 and 9 are diagrams illustrating a connection block formed between first and second pack cases.
Figure 9:
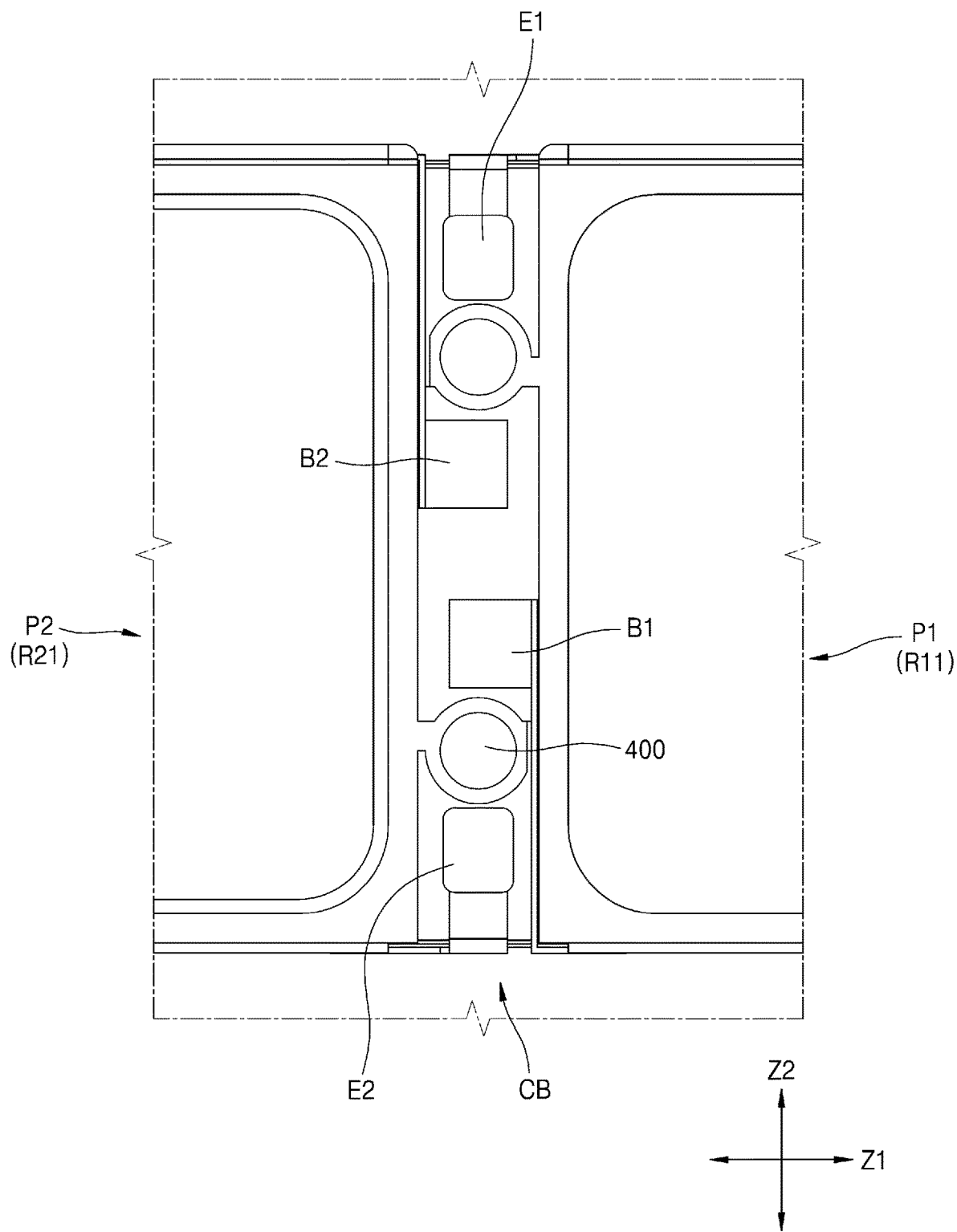

FIGS. 8 and 9 are diagrams illustrating a connection block formed between first and second pack cases.

Referring to FIGS. 8 and 9, a connection block CB may be arranged between the first and second pack cases P1 and P2. For example, the first and second pack cases P1 and P2 and the connection block CB may be arranged in the row direction Z1 in which the plurality of battery cells 10 are arranged. In an embodiment, the connection block CB may physically connect the first and second pack cases P1 and P2 to each other and may support first and second output terminals E1 and E2 of the entire battery pack including the plurality of battery cells 10 accommodated in the first and second pack cases P1 and P2.

First and second bus bars B1 and B2 for electrically connecting the first and second rows R11 and R12 of the battery cells 10 accommodated in the first pack case P1 and the first and second rows R21 and R22 of the battery cells 10 accommodated in the second pack case P2 to each other may be supported on the connection block CB. In this case, by connecting the first and second bus bars B1 and B2 to each other with a fuse (not shown) interposed therebetween, the plurality of battery cells 10 accommodated in the first and second pack cases P1 and P2 may be electrically connected to each other, and an output of the battery pack may be provided through the first and second output terminals E1 and E2. The first and second output terminals E1 and E2 may form charging and discharging paths between the battery pack and an external device (not shown), such as an external charger or an external load.

The connection block CB may be integrally formed with the first and second pack cases P1 and P2, and, in an embodiment, the connection block CB may be integrally formed by a casting process and may be connected to each other without a joint such as a welded portion. For example, the connection block CB may be formed of a same material as those of the first and second pack cases P1 and P2, and, in an embodiment, the connection block CB may be formed of aluminum or an aluminum alloy.

In an embodiment, fixing holes 400 for fixing an entire position of the battery pack may be formed at the connection block CB. For example, fastening members (not shown) may be inserted into the fixing holes 400 of the connection block CB to pass therethrough, and the fastening members (not shown) passing through the connection block CB may be fastened to a mounting plate (not shown) providing a mounting position for the battery pack, so as to firmly fix the entire position of the battery pack.

According to one or more embodiments of the present disclosure, a cooling structure capable of improving cooling efficiency of the battery cells by cooling three surfaces of the battery cell, that is, the first and second side surfaces and the bottom surface together, by using the pack cases including the first and second tank plates extending across the first and second side surfaces of the battery cells and the flow path plate between the first and second tank plates to face the bottom surfaces of the battery cells, is provided.

It is to be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as set forth by the following claims.

What is claimed is:

1. A battery pack comprising:
a plurality of battery cells, each comprising a terminal surface on which a terminal unit is arranged, a bottom surface opposite the terminal surface, and first and second side surfaces spaced apart in a first direction and connecting the terminal surface to the bottom surface;
pack cases accommodating the plurality of battery cells in two rows such that the bottom surfaces face each other, and comprising a flow path plate, which is between the bottom surfaces of the battery cells in the two rows, and comprising a plurality of flow paths accommodating a flow of a cooling medium;
first and second tank plates which respectively form first and second connection tanks that are fluidly connected to the plurality of flow paths and extend across the flow path plate from upper and lower portions of the flow path plate, respectively, to cover the first and second side surfaces; and
a single source unit overlapping the first connection tank in the first direction and connected to the first connection tank so as to be fluidly connected to the plurality of flow paths in a one-to-multiple fluidic connection to supply the cooling medium thereto, wherein the single source unit is connected to the first connection tank along the first direction to supply the cooling medium to the first connection tank to be radially diffused along a base surface of the first tank plate that extends in a plane intersecting the first direction.

2. The battery pack of claim 1, wherein
the flow path plate faces the bottom surfaces of the battery cells, and
the first and second connection tanks face the first and second side surfaces of the battery cells.

3. The battery pack of claim 2, further comprising gap fillers arranged between the bottom surfaces of the battery cells and the flow path plate and between the first and second side surfaces of the battery cells and the first and second tank plates.

4. The battery pack of claim 2, wherein
the pack cases each comprise first and second accommodation spaces at opposite sides in a direction intersecting a row direction of the two rows, and
first and second rows of the two rows of the battery cells are accommodated in the first and second accommodation spaces, respectively.

5. A battery pack comprising:
a plurality of battery cells, each comprising a terminal surface on which a terminal unit is arranged, a bottom surface opposite the terminal surface, and first and second side surfaces connecting the terminal surface to the bottom surface;
pack cases accommodating the plurality of battery cells in two rows such that the bottom surfaces face each other, and comprising a flow path plate, which is between the bottom surfaces of the battery cells in the two rows, and comprising a plurality of flow paths accommodating a flow of a cooling medium, and
first and second tank plates which respectively form first and second connection tanks that are fluidly connected to the plurality of flow paths and extend across the flow path plate from upper and lower portions of the flow path plate, respectively, to cover the first and second side surfaces,
wherein the flow path plate faces the bottom surfaces of the battery cells, and
the first and second connection tanks face the first and second side surfaces of the battery cells,
wherein the pack cases each comprise first and second accommodation spaces at opposite sides in a direction intersecting a row direction of the two rows, and
first and second rows of the two rows of the battery cells are accommodated in the first and second accommodation spaces, respectively, and
wherein outer surfaces of the first and second tank plates opposite the first and second accommodation spaces comprise flat surfaces defining the base surface of the first tank plate and a base surface of the second tank plate, and
inner surfaces of the first and second tank plates contacting the first and second accommodation spaces have a gradient from inlets of the first and second accommodation spaces toward the flow path plate.

6. The battery pack of claim 5, wherein the inner surfaces of the first and second tank plates are inclined such that heights of the first and second accommodation spaces gradually decrease from the inlets of the first and second accommodation spaces toward the flow path plate.

7. The battery pack of claim 6, wherein the flow path plate and the first and second tank plates are integrally connected to each other without a joint.

8. The battery pack of claim 4, wherein, with respect to the flow path plate,
half of each of the first and second tank plates faces the first row of the battery cells, and
the other half of each of the first and second tank plates faces the second row of the battery cells.

9. The battery pack of claim 1, wherein the flow paths extend in a direction parallel to the bottom surfaces of the battery cells so as to connect the first and second connection tanks to each other.

10. The battery pack of claim 1, wherein the flow paths are arranged in a row at intervals along the flow path plate.

11. The battery pack of claim 1, wherein the flow paths comprise empty spaces defining channels buried in the flow path plate.

12. The battery pack of claim 1, wherein the battery pack is configured to flow the cooling medium that is at a low temperature from the first connection tank along the flow paths to be heated through heat exchange with the battery cells to a high temperature, and discharge the cooling medium that is at the high temperature to the second connection tank.

13. The battery pack of claim 1, wherein
the first connection tank defines a flow space for the cooling medium, surrounded by side walls formed along edges of the first tank plate and the base surface of the first tank plate surrounded by the side walls formed along the edges of the first tank plate, and
the second connection tank defines a flow space for the cooling medium, surrounded by side walls formed along edges of the second tank plate and a base surface of the second tank plate surrounded by the side walls formed along the edges of the second tank plate.

14. The battery pack of claim 13, wherein
the first tank plate comprises inlets defined in the base surface of the first tank plate to be connected to the plurality of flow paths, and
the second tank plate comprises outlets defined in the base surface of the second tank plate to be connected to the plurality of flow paths.

15. The battery pack of claim 14, wherein a plurality of the inlets and a plurality of the outlets are arranged in rows along the flow path plate.

16. The battery pack of claim 1, wherein the first and second connection tanks are sealed from an outside by first and second cover plates covering the first and second tank plates, respectively.

17. The battery pack of claim 16, wherein the first and second cover plates are inserted between step portions defined on side walls located along edges of the first and second tank plates, respectively.

18. The battery pack of claim 1, wherein the first and second connection tanks define a single non-partitioned space.

19. The battery pack of claim 18, wherein
the first tank plate comprises the source unit through which the cooling medium is configured to be supplied to the first connection tank, and
the second tank plate comprises a sink unit through which the cooling medium is configured to be discharged from the second connection tank.

20. The battery pack of claim 19, wherein the source unit and the sink unit face each other in a diagonal direction across the first and second tank plates.

21. The battery pack of claim 20, wherein the source unit and the sink unit are located at corner positions of the first and second tank plates, respectively.

22. The battery pack of claim 19, wherein the battery pack is configured to supply the cooling medium that is at a low temperature through the source unit to the flow paths through the inlets arranged in a row while being radially diffused along the base surface of the first tank plate from the source unit, and to discharge the cooling medium that is at a high temperature from the flow paths through the outlets arranged in a row to be discharged to an outside while radially converging along a base surface of the second tank plate.

23. The battery pack of claim 19, wherein the source unit and the sink unit comprise connection units into which a supply pipe to supply the cooling medium and a discharge pipe to discharge the cooling medium are inserted, respectively.

24. The battery pack of claim 19, wherein the first connection tank connects the source unit to a plurality of inlets through the single non-partitioned space.

25. The battery pack of claim 19, wherein the second connection tank connects the sink unit to a plurality of outlets through the single non-partitioned space.

26. The battery pack of claim 1, wherein first and second pack cases of the pack cases are arranged in a row direction in which the plurality of battery cells are arranged.

27. The battery pack of claim 26, wherein each of the first and second pack cases comprises:
first and second accommodation spaces at opposite sides in a direction intersecting the row direction; and
first and second rows of the battery cells accommodated in the first and second accommodating spaces, respectively.

28. The battery pack of claim 27, wherein the battery pack comprises four rows of the battery cells comprising the first and second rows of the battery cells accommodated in the first pack case and the first and second rows of the battery cells accommodated in the second pack case.

29. The battery pack of claim 26, further comprising a connection block arranged between the first and second pack cases.

30. The battery pack of claim 29, further comprising:
bus bars on the connection block and electrically connecting the battery cells accommodated in the first and second pack cases to each other; and
output terminals electrically connected to the bus bars and supported on the connection block.

* * * * *